(12) United States Patent
Trethewey

(10) Patent No.: US 9,430,414 B2
(45) Date of Patent: Aug. 30, 2016

(54) BUS INDEPENDENT PLATFORM FOR SENSOR HUB PERIPHERALS TO PROVIDE COALESCING OF MULTIPLE REPORTS

(71) Applicant: Intel Corporation, Santa Clara, CA (US)

(72) Inventor: James Trethewey, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 669 days.

(21) Appl. No.: 13/844,826

(22) Filed: Mar. 16, 2013

(65) Prior Publication Data

US 2014/0281109 A1    Sep. 18, 2014

(51) Int. Cl.
G06F 13/20 (2006.01)
G06F 13/12 (2006.01)
G06F 13/38 (2006.01)

(52) U.S. Cl.
CPC ........... *G06F 13/126* (2013.01); *G06F 13/385* (2013.01)

(58) Field of Classification Search
USPC ................................. 710/104–110, 306–315
See application file for complete search history.

(56) References Cited

U.S. PATENT DOCUMENTS

| | | | |
|---|---|---|---|
| 5,282,272 A | 1/1994 | Guy et al. | |
| 6,895,002 B2 | 5/2005 | Shah et al. | |
| 7,093,279 B2 | 8/2006 | Trethewey et al. | |
| 7,213,057 B2 | 5/2007 | Trethewey et al. | |
| 7,321,925 B2 | 1/2008 | Trethewey | |
| 2001/0003205 A1 | 6/2001 | Gilbert | |
| 2002/0019673 A1 | 2/2002 | Mirelli et al. | |
| 2002/0056014 A1 | 5/2002 | Nakagawa et al. | |
| 2002/0065962 A1 | 5/2002 | Bakke et al. | |
| 2002/0126091 A1 | 9/2002 | Rosenberg et al. | |
| 2002/0166017 A1 | 11/2002 | Kim et al. | |
| 2003/0009610 A1 | 1/2003 | Nolan et al. | |
| 2003/0018823 A1 | 1/2003 | Ponticelli et al. | |
| 2003/0051079 A1 | 3/2003 | Kolodziej | |
| 2003/0131177 A1 | 7/2003 | Ng | |
| 2003/0163627 A1 | 8/2003 | Deng et al. | |
| 2004/0030861 A1 | 2/2004 | Plackle et al. | |

(Continued)

OTHER PUBLICATIONS

United States Patent and Trademark Office, Office Action mailed Jul. 28, 2015 and Reply filed on Oct. 27, 2015 in U.S. Appl. No. 13/844,821.

(Continued)

*Primary Examiner* — Raymond Phan
(74) *Attorney, Agent, or Firm* — Trop, Pruner & Hu, P.C.

(57) ABSTRACT

A disclosed computer system includes a processor, an I/O hub including a first host bus interface to communicate via a first transport bus, and a sensor hub. The sensor hub includes a first transport bus interface and a sensor hub microcontroller. The sensor hub microcontroller includes a peripheral stack that includes a second transport bus driver to communicate with a peripheral device via a second transport bus. The peripheral device may comply with a device specification such as the human interface device (HID) standard. The peripheral stack further includes a second transport bus plugin to adapt bus-specific operations to generic operations for the device specification, a device class driver to communicate bus-independent peripheral reports based on the generic operations, and a peripheral management module to coalesce multiple peripheral reports into a single instance visible to the I/O hub via the first transport bus interface and the first host bus interface.

20 Claims, 6 Drawing Sheets

(56) References Cited

U.S. PATENT DOCUMENTS

| | | |
|---|---|---|
| 2004/0049606 A1 | 3/2004 | Nakagawa et al. |
| 2004/0128006 A1 | 7/2004 | Jahnicke et al. |
| 2004/0165905 A1 | 8/2004 | Lee |
| 2005/0016296 A1 | 1/2005 | Inoue |
| 2005/0144464 A1 | 6/2005 | Chiu et al. |
| 2005/0169563 A1 | 8/2005 | Inoue et al. |
| 2005/0216620 A1 | 9/2005 | Sandulescu et al. |
| 2005/0229181 A1 | 10/2005 | Vazeille et al. |
| 2005/0265378 A1 | 12/2005 | Julicher et al. |
| 2006/0061927 A1 | 3/2006 | Fadell et al. |
| 2006/0085563 A1 | 4/2006 | Nakagawa et al. |
| 2007/0157742 A1 | 7/2007 | Kouduki et al. |
| 2007/0233430 A1 | 10/2007 | Singh |
| 2008/0005428 A1 | 1/2008 | Maul et al. |
| 2008/0010406 A1 | 1/2008 | Kang et al. |
| 2008/0082276 A1 | 4/2008 | Rivers et al. |
| 2008/0207158 A1 | 8/2008 | Nakagawa et al. |
| 2008/0282012 A1 | 11/2008 | Ishimi |
| 2009/0055695 A1 | 2/2009 | Maddali |
| 2009/0079835 A1 | 3/2009 | Kaplan et al. |
| 2009/0172185 A1 | 7/2009 | Chandra et al. |
| 2009/0228618 A1 | 9/2009 | Kuehm et al. |
| 2009/0307549 A1 | 12/2009 | Choate et al. |
| 2009/0316007 A1 | 12/2009 | Ito et al. |
| 2009/0322711 A1 | 12/2009 | David et al. |
| 2009/0323708 A1 | 12/2009 | Ihle et al. |
| 2010/0042763 A1 | 2/2010 | Bica |
| 2010/0180067 A1 | 7/2010 | Garcia et al. |
| 2010/0207744 A1 | 8/2010 | Lammers et al. |
| 2011/0018819 A1 | 1/2011 | Yeh et al. |
| 2011/0077497 A1 | 3/2011 | Oster et al. |
| 2011/0115641 A1 | 5/2011 | Hidalgo Rodrigo |
| 2012/0054378 A1 | 3/2012 | Malamant et al. |
| 2012/0072628 A1 | 3/2012 | Crockett et al. |
| 2012/0226847 A1 | 9/2012 | Ishimi |
| 2012/0246377 A1 | 9/2012 | Bhesania et al. |
| 2012/0254878 A1 | 10/2012 | Nachman et al. |
| 2013/0082939 A1 | 4/2013 | Zhao et al. |
| 2013/0246665 A1 | 9/2013 | Lee et al. |
| 2014/0114475 A1 | 4/2014 | Song et al. |
| 2014/0268229 A1* | 9/2014 | Kempka .............. G06F 9/4413 358/1.15 |
| 2014/0281113 A1 | 9/2014 | Trethewey |

OTHER PUBLICATIONS

United States Patent and Trademark Office, Request for Continuing Examination filed Apr. 19, 2016 in U.S. Appl. No. 13/844,821.

\* cited by examiner

FIG. 4A

| HOST I/F Udriver 351 | BUS ID 402 | BUS NAME 404 | CBH for INPUT REPORTS 406 | CBH for HOST P STATE 408 | CBH for HOST WAKEUP 410 |
|---|---|---|---|---|---|
| 320-1 | 142-1 | USB | | | |
| 320-2 | 142-2 | I2C | | | |
| 320-3 | 142-3 | BT | | | |

(401; rows 411-1, 411-2, 411-3)

FIG. 4B

| CLIENT HOST I/F 352 | CLIENT ID 452 | CLIENT NAME 454 | CBH for POWER STATE 456 | CBH FOR HID REPORT TUPLE 1.1 458 | CBH FOR HID REPORT TUPLE 1.2 460 |
|---|---|---|---|---|---|
| 340-1 | | | | | |
| 340-2 | | | | | |
| 340-3 | | | | | |

(450; rows 352-1, 352-2, 352-3)

BUS INDEPENDENT PLATFORM FOR SENSOR HUB PERIPHERALS TO PROVIDE COALESCING OF MULTIPLE REPORTS

TECHNICAL FIELD

Embodiments described herein generally related to the field of computer systems and, more particularly, hardware and firmware support for system I/O.

BACKGROUND

Computers and other microprocessor-based systems may include peripheral devices that exchange data with the host system. As the number and types of peripheral devices and the number of protocols over which peripheral devices communicate increases and changes, it becomes increasingly important to implement peripheral device controllers, drivers, and other firmware in a flexible and extensible manner.

BRIEF DESCRIPTION OF THE DRAWINGS

FIG. 4A and FIG. 4B illustrate registration information used in conjunction with at least one embodiment;

DESCRIPTION OF EMBODIMENTS

Figure 1:
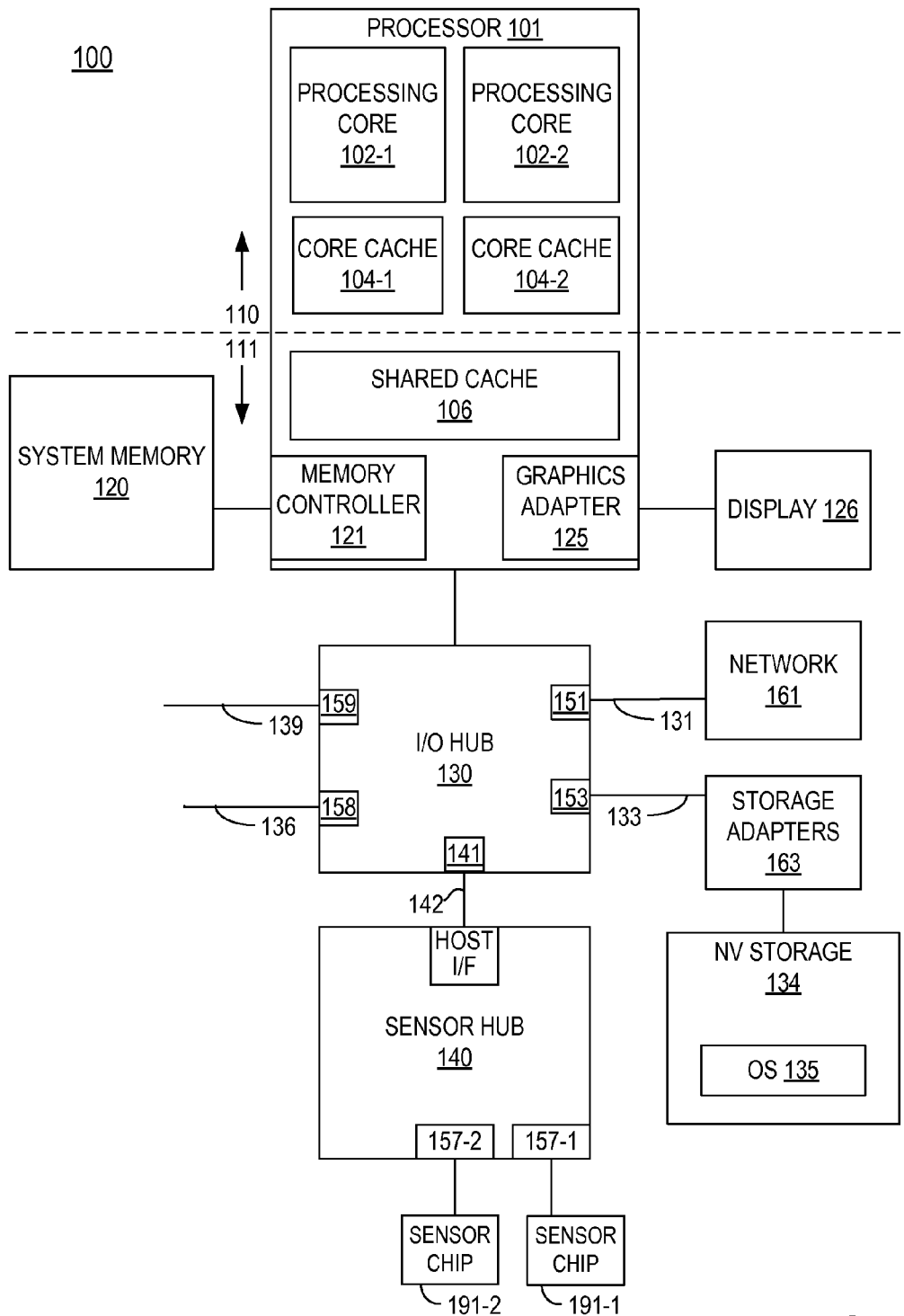
FIG. 1 illustrates a computer system used in conjunction with at least one embodiment of a peripheral device microcontroller.

In at least one embodiment, a computer system includes a processor in combination with a first bus interface to a first transport bus, a first peripheral device, and a hub microcontroller. In one embodiment, the hub microcontroller includes a first host bus interface microdriver associated with the first transport bus, a first manager client associated with the first peripheral device, and a host manager module to: detect a communication between the first host and the first peripheral device, determine a recipient of the communication, access registration information to identify a callback handler associated with the recipient, associate the communication with the callback handler, and initiate the callback handler to forward the communication to the recipient.

In one embodiment in which the first host is the recipient, the callback handler comprises a first host bus interface callback handler, and initiating the callback handler includes directing the first host bus interface microdriver to execute the callback handler. The first peripheral device is a human interface device (HID) including but not limited to: USB, I2C, SPI, Bluetooth, and PCIe. In an HID compliant embodiment, the communication includes an HID formatted input report. The computer system includes a second host that includes a processor and a second bus interface to a second transport bus. The hub microcontroller may include a second host bus interface microdriver associated with the second transport bus. In at least one of these embodiments, the registration information includes first host bus interface microdriver registration information identifying the first transport, a first callback handler, and second host bus interface microdriver registration information identifying the second bus transport and a second callback handler. In at least one of these embodiments, the input report identifies a target host interface associated with a transport bus selected from the first transport bus and the second transport bus. In at least one embodiment, the host manager module is operable to initiate the first callback handler, responsive to the target host interface identifying the first host, to forward the input report to the first host via the first bus transport, and to initiate the second callback handler, responsive to the target host interface identifying the second host, to forward the input report to the second host via the second bus transport.

The host manager module is operable, in some embodiments, to receive the first host bus interface microdriver registration information from the first host bus interface microdriver in response to a registration request from the first host bus interface module, receive the second host bus interface microdriver registration information from the second host bus interface microdriver in response to a registration request from the second host bus interface module, and receive first manager client registration information from the first manager client in response to a registration request from the first manager client. The registration requests initiate in response to a boot sequence following a system reset. In one embodiment, the recipient is the first client interface, the first peripheral device is an HID, and the communication comprises an HID compliant output report. In one embodiment, the callback handler comprises a first client interface callback handler and initiating the callback handler, includes directing the first client interface to execute the callback handler. The computer system may further include a second peripheral device, a second manager client associated with a second peripheral device. In at least one of these embodiments, the registration information includes: first client interface registration information identifying the first transport and a corresponding first callback handler as well as second client interface registration information identifying the first transport and a corresponding first callback handler. In some embodiments, the first peripheral device includes a sensor including, but not limited to: a compass, an accelerometer, a gyroscope, a global positioning system (GPS) device, and an ambient light sensor.

Throughout this disclosure, a hyphenated form of a reference numeral refers to a specific instance of an element and the un-hyphenated form of the reference numeral refers to the element generically or collectively. Thus, widget 12-1 refers to an instance of a widget class, which may be referred to collectively as widgets 12 and any one of which may be referred to generically as a widget 12.

Turning now to the drawings, FIG. 1 illustrates a computer system 100 that includes at least one embodiment of a peripheral device microcontroller. As illustrated in FIG. 1, system 100 includes a processor 101 with an integrated memory controller 121 and graphics adapter 125 and an I/O hub 130 to provide various I/O interfaces. In FIG. 1, a core region 110 of processor 101 includes a first processing core 102-1 with a first core cache 104-1 and a second processing core 102-2 with a second core cache 104-2. Although the illustrated core region 110 includes two cores, other embodiments may include more or fewer cores. Each core cache 104 includes one or more cache memories. In at least one embodiment, each core cache 104 includes a level one (L1) data cache to store data, an L1 instruction cache to store instructions, and an intermediate or level (L2) cache to store both data and instructions.

An uncore region 111 of processor 101 includes memory controller 121, graphics adapter 125, and a level 3 (L3) cache memory 106, shared between processing cores 102-1 and 102-2, and referred to herein as shared cache 106. Memory controller 121 provides an interface between processor 101 and system memory 120. In at least one embodiment, graphics adapter 125 provides graphics processing and video decoding for a display 126. Although the illustrated processor 101 and system 100 depict memory controller 121 and graphics adapter 125 integrated within uncore region 111 of processor 101, other embodiments may provide memory control and/or graphics control functionality in I/O hub 130 or another chipset device.

As illustrated in FIG. 1, I/O hub 130 includes a network interface 151 to provide a communication transport 131 suitable for a network 161, which may be a wired or wireline, public or private network, and an interface 153 to provide a storage transport 133 to which one or more storage adapters 163. FIG. 1 illustrates nonvolatile mass storage 134, in which an operating system (OS) 135 is stored, connected to storage adapter 163. Nonvolatile mass storage may include, but is not limited to, a magnetic core hard disk drive, a solid state drive, and a phase change RAM. Some embodiments of I/O hub 130 include an interface 158 that provides a low bandwidth bus 136 including but not limited to SPI, I2C, and legacy ISA busses. Some embodiments of I/O hub 130 provide one or peripheral bus controllers 159 for one or more corresponding peripheral buses 139 including but not limited to USB, I2C, Bluetooth, and Zigbee.

In FIG. 1, I/O hub 130 includes a peripheral transport interface 141 to support communication with one or more peripheral devices over a peripheral device transport 142. Peripheral device transport 142 may be embodied as a USB transport, an I2C transport, a Bluetooth transport, a PCIe transport, or another suitable transport. Although some embodiments include a single transport, other embodiments may support two or more additional peripheral device transports.

As illustrated in FIG. 1, system 100 includes a sensor hub 140 to support one or more peripheral devices. In at least one embodiment, sensor devices include HID compliant sensors. HID specifies a format by which a device or client defines its capabilities to a host device in a structured exchange. Thereafter, information or data, may be transferred from host to client or client to host. Although HID was defined in conjunction with devices, including keyboards and mice, with which humans interact, the format is more generally applicable to other categories of devices including sensors.

Although identified as a sensor hub, sensor hub 140 may support other peripheral devices as well, including but not limited to HID compliant peripheral devices including but not limited to keyboards, computer mouse, touchscreens, and touchpads. FIG. 1 illustrates sensor hub 140 including interfaces 157-1 and 157-2 to which a first sensor chip 191-1 and a second sensor chip 191-2 are connected. Other embodiments may include more or fewer sensor chips. Embodiments of sensor chips 191-1, 191-2 include gyroscopes, accelerometers, global GPS devices, compasses, ambient light sensors, and other suitable sensors. The term "sensor" as used herein refers to a category or class of HID that, while not requiring human interaction, provides data in a similar form. At least some sensors receive environmental rather than human input.

Figure 2:
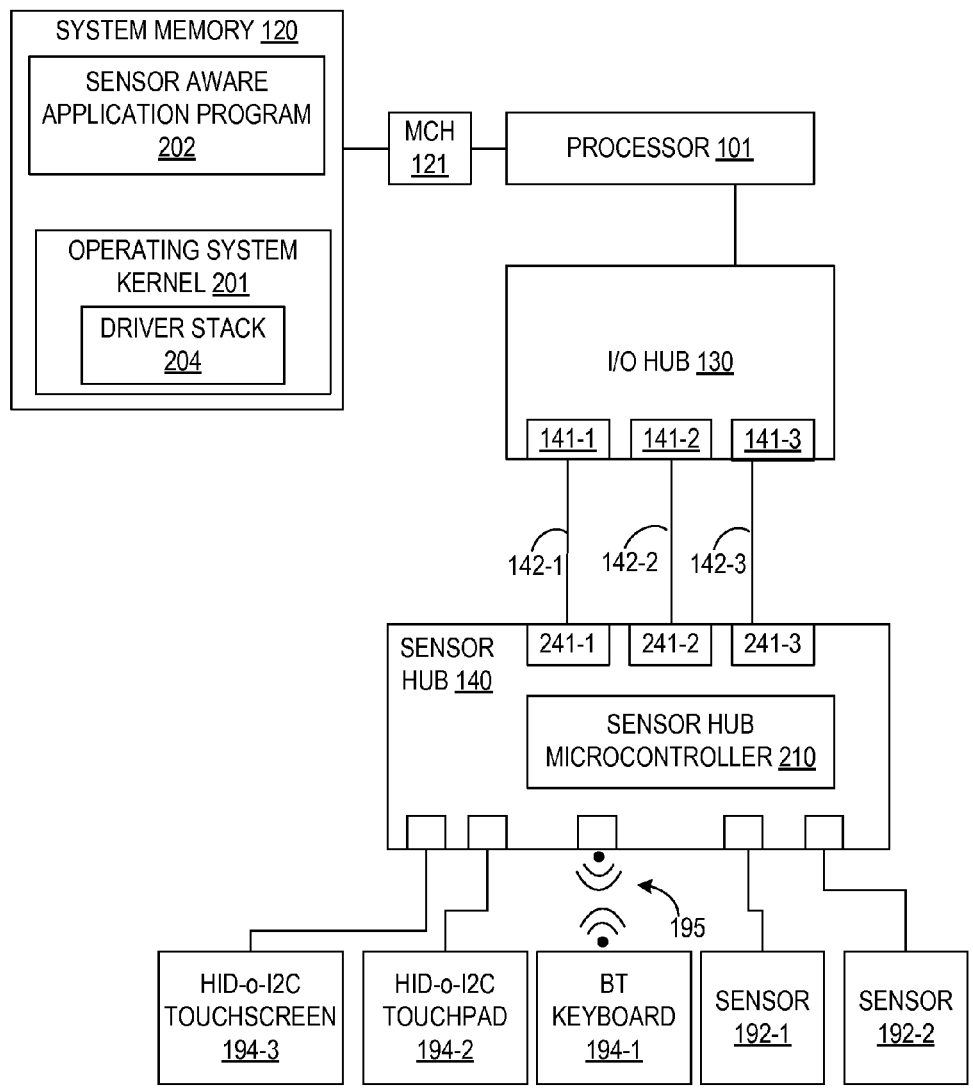
FIG. 2 illustrates a computer system used in conjunction with at least one embodiment.

Turning now to FIG. 2, an illustrated system 100 includes a sensor aware application program 202 and an operating system kernel 201 stored in system memory 120, accessible to processor 101 via memory controller 121. Operating system kernel 201 includes one or more driver stack(s) 204 to support one or more host bus interfaces 141 in I/O hub 130.

In the embodiment of computer system 100 illustrated in FIG. 2, I/O hub 130 supports host bus interfaces 141-1, 141-2, and 141-3. In at least one embodiment, the peripheral transport 141-1 is a USB transport, transport 141-2 is an I2C transport, and transport 141-3 is a Bluetooth transport.

As illustrated in FIG. 2, computer system 100 includes a sensor hub 140 and an sensor hub microcontroller 210. In at least one embodiment, sensor hub 140 includes a printed circuit board or card and sensor hub microcontroller 210 is an embedded device. FIG. 1 illustrates sensor hub 140 including hardware interface 241-1 providing an interface for peripheral transport 142-1, interface 241-2 providing an interface for peripheral transport 142-2, and interface 241-3 providing an interface for peripheral transport 142-3.

A client side of sensor hub 140 as illustrated in FIG. 2 includes a first sensor 192-1, a second sensor 192-2 and HID peripheral devices 194-1, 194-2, and 194-3. A keyboard 194-1 communicates with sensor hub 140 via a Bluetooth interface 195. An HID over I2C touchpad 194-2 and an HID over I2C touchscreen 194-3 connect to sensor hub 140 via respective I2C interfaces.

Computer system 100 illustrates the ability to connect powerful devices compliant with the various powerful transports and to connect them to a common microcontroller for use with any of various protocol transports provided by I/O hub 130. Although FIG. 2 illustrates two sensors and three HID peripherals connected to sensor hub microcontroller 210 over three different transports, other embodiments may include more, fewer, and/or different devices, sensors, and/or transports.

Figure 3:
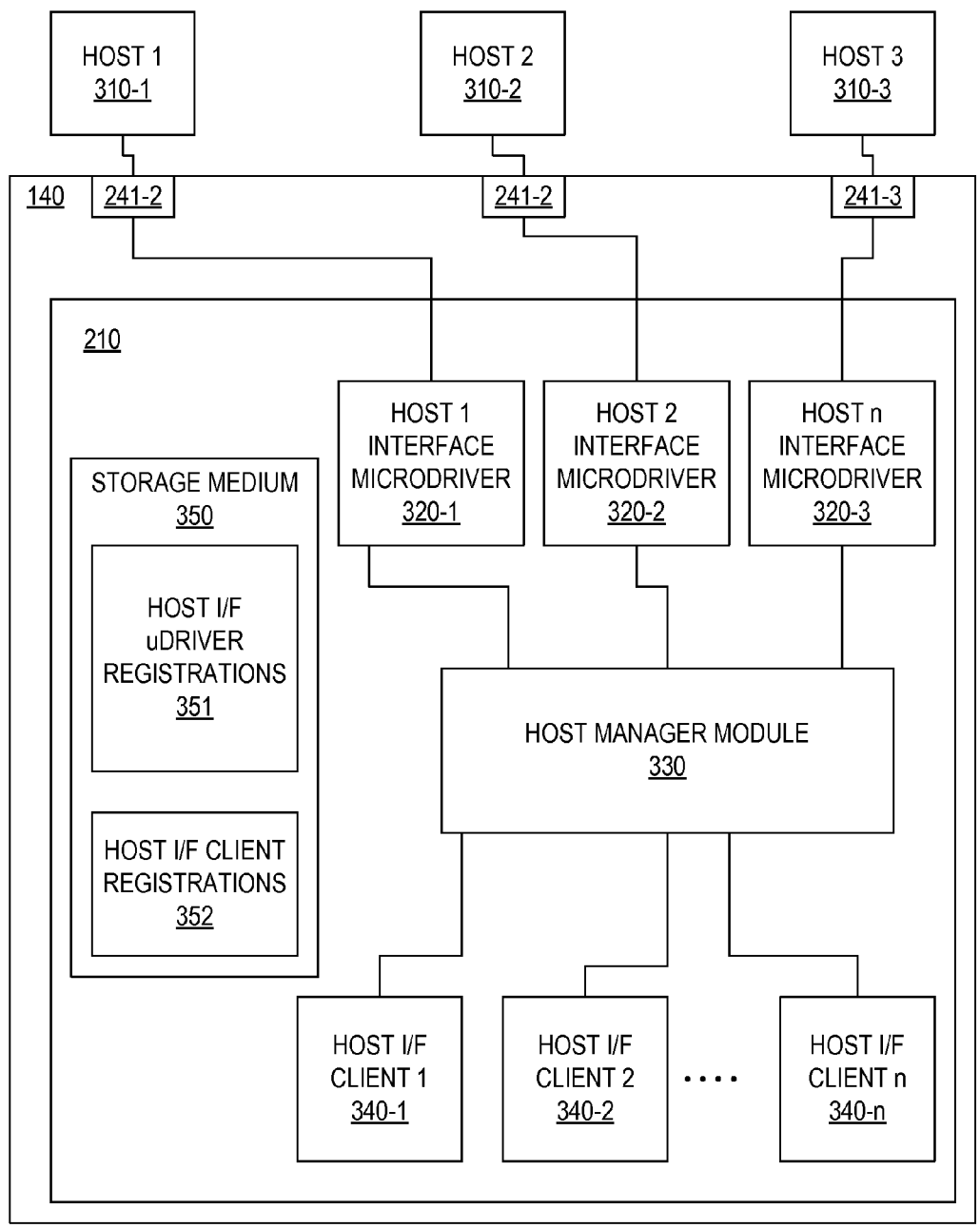
FIG. 3 illustrates microcontroller elements of the FIG. 1 system used in conjunction with at least one embodiment.

Referring now to FIG. 3, an embodiment of sensor hub microcontroller 210 functions as a registrar for host interface microdrivers and client manager firmware and as a crossbar for communications between hosts and peripheral devices. In FIG. 3, sensor hub microcontroller 210 includes host interface microdrivers 320-1, 320-2, and 320-3, one for each type of host interface bus. In FIG. 3, host interface microdriver 320-1 is associated with host 1 interface 310-1, host 2 interface microdriver 320-2 is associated with host 2 310-2, and host 3 interface microdriver 32-3 is associated with 310-3.

The illustrated microcontroller 140 further includes a host interface module 330 to server as a "crossbar" or "router" between the host interface busses and the rest of the internal sensor hub firmware. In at least one embodiment, each host interface microdriver 320 registers itself with host manager module 330 at boot up/initialization time for statically configured buses or dynamically at runtime for plug and play buses as needs arise. Host manager module 330 stores information about registered host interface microdrivers 320 in storage medium 350 as host interface microdriver registration storage 351.

Referring to FIG. 4A, Host interface microdriver registration information 401 can include, but is not limited to entries 411 for multiple host interface microdrivers 320 where each entry 411 indicates information including but not limited to: a bus identifier 402, bus name 404, a callback handler 406 for forwarding asynchronous HID input reports from peripheral to host, a callback handler 408 for determining host power state using bus specific means, and a callback handler 410 for waking the host with bus specific needs.

Returning to FIG. 3 In at least one embodiment, the sensor hub microcontroller 210 also includes a multiplicity of manager clients 340, which process messages from one or more hosts. Clients 340 register themselves with host manager module 330 at firmware boot up/initialization time or dynamically at run time as needs arise. The host manager module 330 stores information about registered clients in storage medium 350 as host interface microdriver registration storage 352.

Referring to FIG. 4B, manager client registration information 450 can include but is not limited to: a client identifier 452, client name 454, called back handler 456 for forwarding device DX-state power requests to the internal firmware, and a multiplicity of callbacks, e.g., 458, 460, for each synchronous HID report request specified by a (request type, HID report ID) tuple. A manager client 340 may register the same callback for one or more tuples or have separate handlers for each tuple. In at least one embodiment, sensor hub 140 is an HID-compliant sensor hub that advertises more than one HID top-level collections (TLCs) in its HID report descriptor, including, but not limited to: a TLC for HID sensor collection, a TLC for HID keyboard, a TLC for HID mouse, and/or a TLC for HID touch screen. Each of these TLC's may have different protocol requirements (HID report formats), and separate/independent client modules for each is both a flexible and efficient partitioning and encapsulation strategy.

Figure 5:
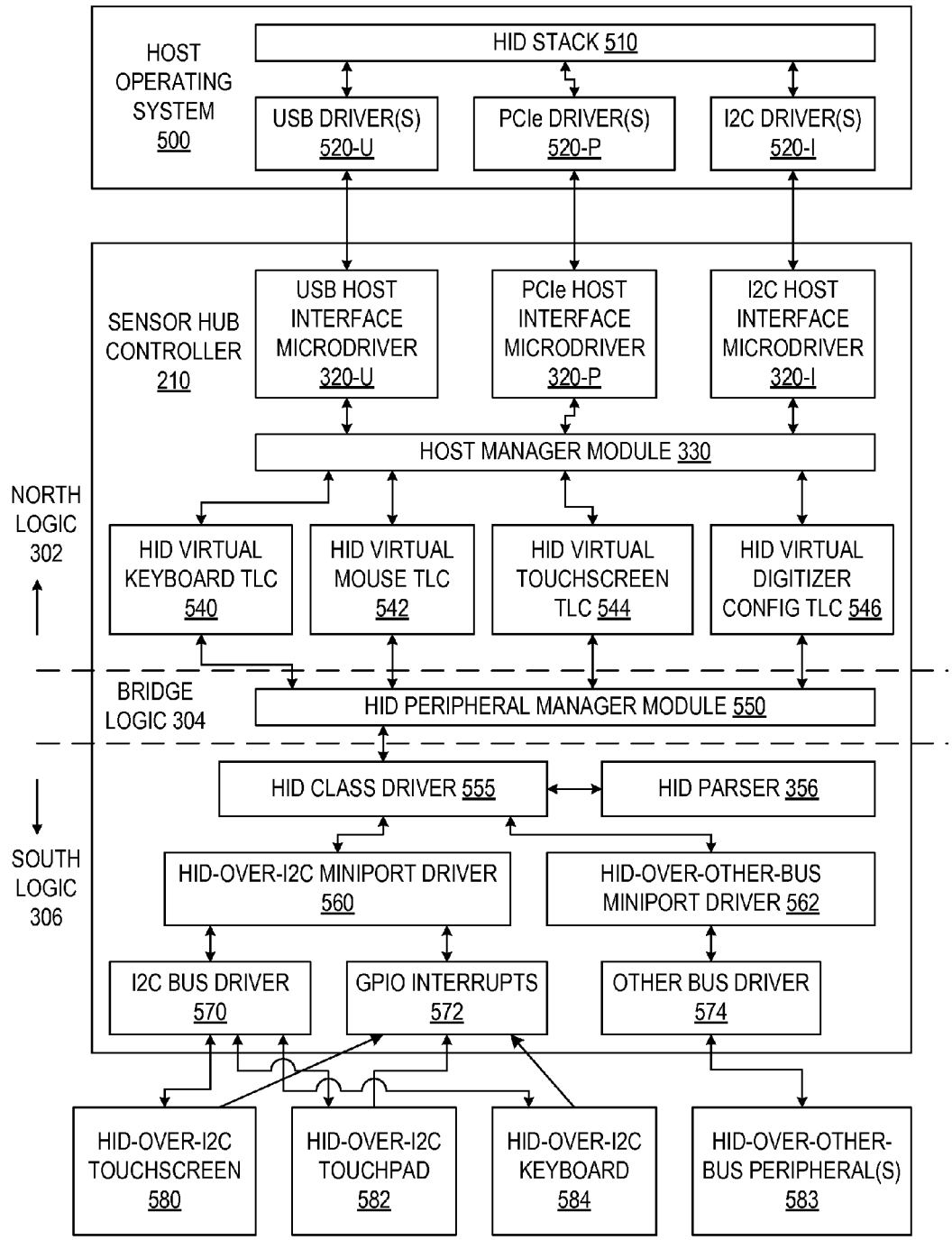
FIG. 5 illustrates a microprocessor based system used in conjunction with at least one embodiment.

In FIG. 5, sensor hub microcontroller 210 connects to host operating system 500 by means of one or more bus interfaces via an HID stack 510 and supporting device drivers, including but not limited to: USB drivers 520-U, PCI express drivers 520-P, and/or I2C drivers 520-I. For example, in at least one embodiment, the I2C drivers 520-I include an HID over I2C miniport driver, a simple peripheral bus framework (SPB), and a vendor-supplied I2C controller driver. The sensor hub microcontroller 210 provides its internal firmware modules to these buses via a host manager module 330 and one host interface microdriver per bus type, including but not limited to: USB host interface microdriver 320-U, PCI express host interface driver 320-P, and/or I2C host interface microdriver 320-I.

Firmware for sensor hub microcontroller 210 firmware includes an HID report descriptor containing HID top-level collections (TLCs) describing virtual HID peripherals, including, but not limited to: HID virtual keyboard TLC 540, HID virtual mouse TLC 542, HID virtual touchscreens TLC 544, and HID virtual digitizer configuration TLC 546.

The HID virtual keyboard TLC 540 and HID virtual mouse TLC 542 conform to the operation of an HID keyboard and HID mouse as described in the HID specification (version 1.11 adopted and published by the USB implementers forum (USB-IF)).

The HID virtual touchscreen TLC 544 and HID virtual digitizer configuration TLC conform to the operation of a HID touchscreen as described in the HUTRR 34 specification adopted and published by the USB implementers forum (USB-IF).

The sensor hub microcontroller firmware also contains an HID peripheral manager module 550 to send and receive HID reports (input reports, output reports, and feature reports) between actual physically connected HID peripherals and a host operating system to which the sensor hub 140 is attached.

The HID peripherals that are physically connected via the I2C bus and one or more GPIOs 572 (for example, I2C interrupt line) may conform to the HID-over-I2C specification version 1.0 (or later) and-or the Modern Touchpad Specification 1.05 (or later) (Microsoft Corporation). These HID peripherals include but are not limited to: HID-over-I2C touchscreen 580, HID-over-I2C touchpad 582, and HID-over: I2C keyboard 584.

The firmware uses an I2C bus class driver 570 and GPIO interrupts driver 572 to interface directly to these peripherals. Other HID peripherals 583 may be physically connected by means of other buses and their supporting bus drivers 574. The sensor hub microcontroller firmware also contains an HID peripheral device extraction module called the HID class driver 555. Bus-specific plug-ins adapt generic HID class operations to bus-specific operations by means of adaptation drivers including but not limited to: HID over I2C miniport driver 560 and HID over other bus miniport drivers 562 appropriate for other buses.

Internal sensor hub firmware modules such as the HID peripheral manager 550 receive HID reports in a bus-independent fashion via the generic HID class driver 555. The HID reports may include but are not limited to: HID touchscreen reports, HID digitizer configuration reports, HID mouse reports, and HID keyboard reports. The HID peripheral manager is responsible for coalescing multiple such reports from underlying peripherals into a single instance of each as visible by the host operating system.

Figure 6:
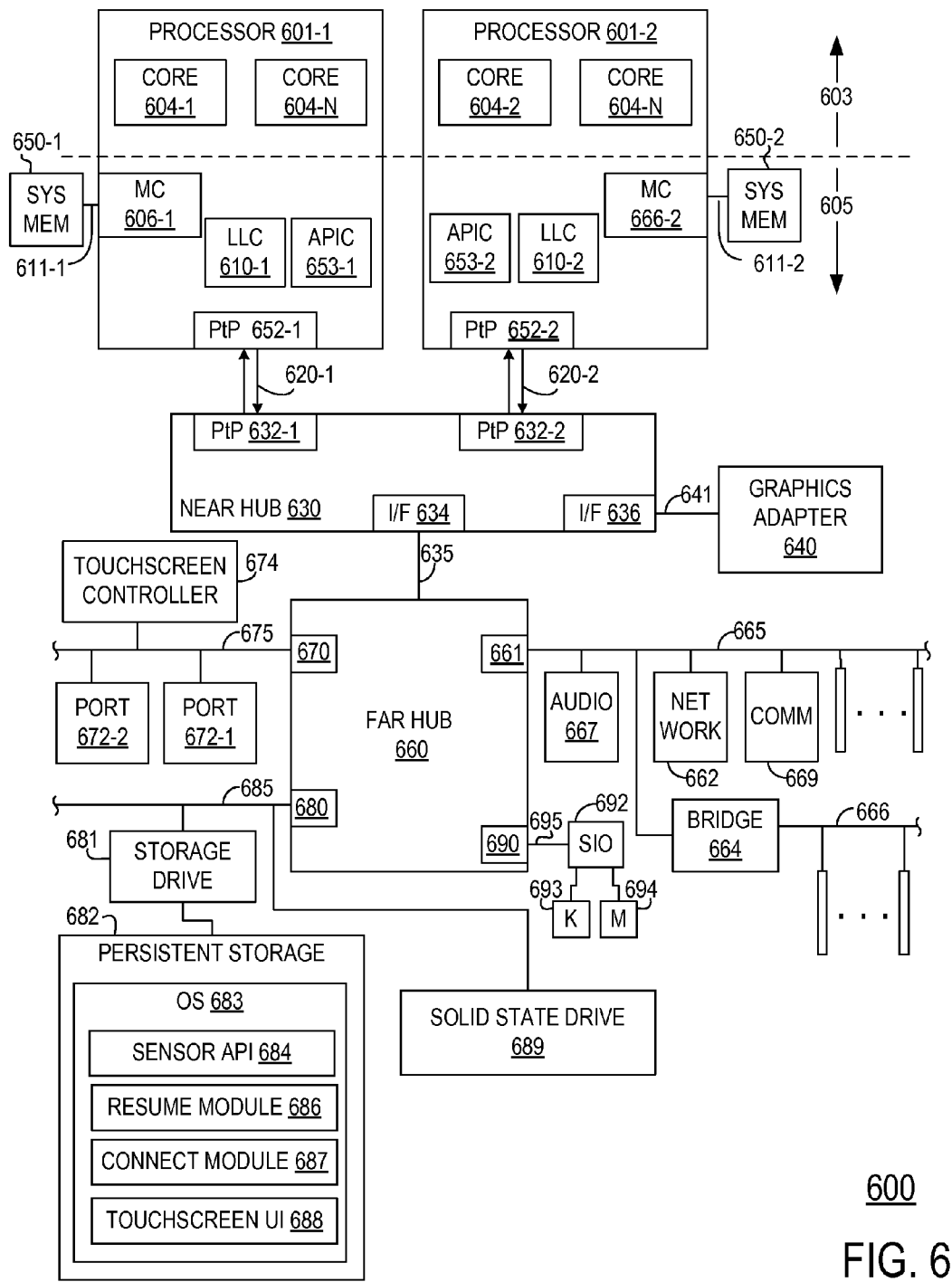
FIG. 6 illustrates a system used in conjunction with at least one embodiment.

Referring now to FIG. 6, a block diagram illustrates selected elements of at least one embodiment of a multi-processor system platform 600 used in conjunction with one or more embodiments. As illustrated in FIG. 6, system includes a first processor 601-1, a second processor 601-2, and an I/O hub referred to herein as near hub 630. Near hub 630 communicates with processor 601-1 over a point-to-point interconnect 620-1 connected between a point-to-point interface 632-1 of near hub 630 and a point-to-point interface 652-1 of processor 601-1. Similarly, near hub 630 communicates with processor 601-2 via point-to-point interconnect 620-2 between point-to-point interface 632-2 of near hub 630 and point-to-point interface 652-2 of processor 601-2. In FIG. 6, near hub 630 also includes a graphics interface 636 to communicate with a graphics adapter 640 over a dedicated graphics bus 641, which may be a PCI Express or other suitable type of interconnection. Multiprocessor system platform 600 may further include a point-to-point interconnect (not illustrated) between processor 601-1 and processor 601-2. The point-to-point interconnects 620 illustrated in FIG. 6 include a pair of uni-directional interconnections with one of the interconnections communicating data from the applicable processor 601 to near hub 630 and the other interconnection communicating data from near hub 630 to the processor 601.

The FIG. 6 processors 601 may be described as including a core portion 603 and an uncore portion 605. The core portions 603 of the FIG. 6 processors 601 include multiple processor cores, referred to herein simply as cores 604-1 through 604-$n$. Each core 604 may include logic implemented in hardware, firmware, or a combination thereof that provides, as examples, an execution pipeline suitable for fetching, interpreting, and executing instructions and storing or otherwise processing results of those instructions. Uncore portions 605 of the FIG. 6 processors 601 may include a system memory controller (MC) 606, a cache memory referred to herein as the last level cache 610, and an interrupt controller 653. Each system memory interface 606 may perform various memory controller functions. Last level cache 610 may be shared among each of the cores 604 of processor 601.

The FIG. 6 multiprocessor system platform 600 employs a distributed or non-uniform system memory architecture in which the system memory as a whole is implemented as a plurality of system memory portions 650 with each system memory portion 650 being directly connected to a processor 601 via a corresponding memory interconnect 611 and system memory controller 606. In this distributed memory configuration, each processor 601 may interface directly with its corresponding system memory portion 650 via its local system memory controller 606. In addition, any processor, e.g., processor 601-1, may read from or write to a memory portion, e.g., system memory portion 650-2 associated with a different processor, e.g., processor 601-2, but the originating processing may need to go through one or more point-to-point interconnects 620 to do so. Similarly, the last level cache 610 of each processor 601 may cache data from its own processor's system memory portion 650 or from another processor's system memory portion.

Although FIG. 6 depicts a distributed memory configuration, other embodiments may employ a uniform memory architecture in which, for example, the entire system memory is connected to a memory controller implemented in near hub 630 rather than having multiple system memory portions 650, each connected to a corresponding processor-specific memory controller 606 implemented in the uncores 605 of each processor 601. Such a system is described below with respect to FIG. 6. Moreover, although FIG. 6 depicts a point-to-point configuration in which processors 601 communicate with each other and with near hub 630 via dedicated point to point interconnections 620, other embodiments may employ a shared system bus to which each of the processors 601 and near hub 630 is connected.

As illustrated in FIG. 6, system platform 600, near hub 630 includes an I/O interface 634 to communicate with a far hub 660 over an I/O interconnection 635. Far hub 660 may integrate, within a single device, adapters, controllers, and ports for various interconnection protocols to support different types of I/O devices. The illustrated implementation of far hub 660 includes, as an example, an expansion bus controller 661 that supports an expansion bus 665 that complies with PCI, PCI Express, or another suitable bus protocol. Examples of functions that may be provided via expansion bus 665 include a network adapter 662, an audio controller 667, and a communications adapter 669. Network adapter 662 may enable communication with an IEEE 802.11 family or other type of wireless data network, a Gigabit Ethernet or other type of wire line data network, or both. Audio controller 667 may include or support high definition audio codecs. Communications adapter 669 may include or support modems and/or transceivers to provide wireless or wire line telephony capability. Bus controller 661 may further recognize a bus bridge 664 that supports an additional expansion bus 666 where expansion bus 666 and expansion bus 665 have the same protocol or different protocols. Far hub 660 may further include a high bandwidth serial bus controller 670 that provides one or more ports 672 of a USB or other suitable high bandwidth serial bus 675.

As illustrated in FIG. 6, far hub 660 further includes a storage adapter 680 that supports a persistent storage interconnect 685 such as an Integrated Drive Electronics (IDE) interconnect, a Serial ATA interconnect, a SCSI interconnect, or another suitable storage interconnect to a storage drive 681 that controls persistent storage 682. Far hub 660 may further include a Low Pin Count (LPC) controller 690 that provides an LPC bus 695 to connect low bandwidth I/O devices including, as examples, a keyboard 693, a mouse 694, a parallel printer port (not illustrated), and an RS232 serial port (not illustrated). Multiprocessor system platform 600 as illustrated in FIG. 6 employs a Super I/O chip 692 to interface keyboard 693 and mouse 694 with LPC controller 690.

As illustrated in FIG. 6, system platform 600 emphasizes a computer system that incorporates various features that facilitate handheld or tablet type of operation and other features that facilitate laptop or desktop operation. In addition, As illustrated in FIG. 6, system platform 600 includes features that cooperate to aggressively conserve power while simultaneously reducing latency associated with traditional power conservation states.

As illustrated in FIG. 6, system platform 600 includes an operating system 683 that may be entirely or partially stored in a persistent storage 682. Operating system 683 may include various modules, application programming interfaces, and the like that expose to varying degrees various hardware and software features of system platform 600. As illustrated in FIG. 6, system platform 600 includes, for example, a sensor API 684, a resume module 686, a connect module 687, and a touchscreen user interface 688. System platform 600 as illustrated in FIG. 6 may further include various hardware/firm features including a capacitive or resistive touch screen controller 674 and a second source of persistent storage such as a solid state drive (SSD) 689.

Sensor API 684 provides application program access to one or more of the FIG. 2 sensors (not illustrated in FIG. 5) that may be included in system platform 600. The resume module 686 may be implemented as software that, when executed, performs operations for reducing latency when transitioning system platform 600 from a power conservation state to an operating state. Resume module 686 may work in conjunction with SSD 689 to reduce the amount of SSD storage required when system platform 600 enters a power conservation mode. Resume module 686 may, for example, flush standby and temporary memory pages before transitioning to a sleep mode. By reducing the amount of system memory space that system platform 600 is required to preserve upon entering a low power state, resume module 686 beneficially reduces the amount of time required to perform the transition from the low power state to an operating state. The connect module 687 may include software instructions that, when executed, perform complementary functions for conserving power while reducing the amount of latency or delay associated with traditional "wake up" sequences. For example, connect module 687 may periodically update certain "dynamic" applications including, as examples, email and social network applications, so that, when system platform 600 wakes from a low power mode, the applications that are often most likely to require refreshing are up to date. The touchscreen user interface 688 supports a touchscreen controller 674 that enables user input via touchscreens traditionally reserved for handheld applications. In FIG. 6, the inclusion of touchscreen support, in conjunction with support for keyboard 693 and mouse 694, enable system platform 600 to provide features traditionally found in dedicated tablet devices as well as features found in dedicated laptop and desktop type systems.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A computer system, comprising:
   a processor;
   an I/O hub including a first host bus interface to communicate via a first transport bus; and
   a sensor hub including:
      a first transport bus interface to communicate with the I/O hub via the first transport bus; and
      a sensor hub microcontroller including:
         a second transport bus driver to communicate with a peripheral device via a second transport bus, wherein the peripheral device complies with a device specification;
         a second transport bus plugin to adapt bus-specific operations to generic operations for the device specification;
         a device class driver to communicate bus-independent peripheral reports based on the generic operations; and
         a peripheral management module to coalesce multiple peripheral reports into a single instance visible to the I/O hub via the first transport bus interface and the first host bus interface.

2. The computer system of claim 1, further comprising:
   the peripheral device, wherein the peripheral device is communicatively coupled to the sensor hub microcontroller via the second transport bus.

3. The computer system of claim 2, wherein the peripheral device complies with a human interface device (HID) specification.

4. The computer system of claim 3, wherein the peripheral device communicates a general purpose I/O interrupt to the sensor hub microcontroller.

5. The computer system of claim 3, wherein the peripheral device is selected from the group of devices consisting of: a touchscreen device, a touchpad device, a keyboard device, a compass, an accelerometer, a gyroscope, a global positioning system (GPS) device, and an ambient light sensor.

6. The computer system of claim 5, wherein:
   the first transport bus is selected from a plurality of transport buses consisting of: a USB-compliant transport bus, an SPI-compliant transport bus, a Bluetooth-compliant transport bus, and a PCIe-compliant transport bus.

7. The computer system of claim 6, wherein:
   the second transport bus comprises an I2C-compliant transport bus.

8. A sensor hub, comprising:
   a first transport bus interface to communicate with an I/O hub via a first transport bus; and
   a sensor hub microcontroller including:
      a second transport bus driver to communicate with a peripheral device via a second transport bus, wherein the peripheral device complies with a device specification;
      a second transport bus plugin to adapt bus-specific operations to generic operations for the device specification;
      a device class driver to communicate bus-independent peripheral reports based on the generic operations; and
      a peripheral management module to coalesce multiple peripheral reports into a single instance visible to the I/O hub via the first transport bus interface and the first host bus interface.

9. The sensor hub of claim 8, further comprising:
   the peripheral device, wherein the peripheral device is communicatively coupled to the sensor hub microcontroller via the second transport bus.

10. The sensor hub of claim 9, wherein the peripheral device complies with a human interface device (HID) specification.

11. The sensor hub of claim 10, wherein the peripheral device communicates a general purpose I/O interrupt to the sensor hub microcontroller.

12. The sensor hub of claim 10, wherein the peripheral device is selected from the group of devices consisting of: a touchscreen device, a touchpad device, a keyboard device, a compass, an accelerometer, a gyroscope, a global positioning system (GPS) device, and an ambient light sensor.

13. The sensor hub of claim 12, wherein:
   the first transport bus is selected from a plurality of transport buses consisting of: a USB-compliant transport bus, an SPI-compliant transport bus, a Bluetooth-compliant transport bus, and a PCIe-compliant transport bus.

14. The sensor hub of claim 13, wherein:
   the second transport bus comprises an I2C-compliant transport bus.

15. The sensor hub of claim 14, further comprising an HID report descriptor, accessible to the peripheral manager module, for a virtual HID peripheral device.

16. A computer readable storage medium including processor executable program instructions, the program instructions comprising:
   first transport bus interface instructions to communicate with an I/O hub via a first transport bus;
   second transport bus driver instructions to communicate with a peripheral device via a second transport bus, wherein the peripheral device complies with a device specification;
   second transport bus plugin instructions to adapt bus-specific operations to generic operations for the device specification;
   device class driver instructions to communicate bus-independent peripheral reports based on the generic operations; and
   peripheral management module instructions to coalesce multiple peripheral reports into a single instance visible to the I/O hub via the first transport bus interface and the first host bus interface.

17. The computer readable storage medium of claim 16, wherein the peripheral device complies with a human interface device (HID) specification.

18. The computer readable storage medium of claim 17, wherein the second transport bus comprises an I2C-compliant transport bus.

19. The computer readable storage medium of claim 18, further comprising:
   general purpose I/O interrupt instructions to process a general purpose interrupt from the peripheral device.

20. The computer readable storage medium of claim 18, wherein the first transport bus is selected from a plurality of transport buses consisting of: a USB-compliant transport bus, an SPI-compliant transport bus, a Bluetooth-compliant transport bus, and a PCIe-compliant transport bus.

* * * * *